United States Patent
Hama et al.

(10) Patent No.: US 6,966,434 B2
(45) Date of Patent: Nov. 22, 2005

(54) GUIDE CHAIN

(75) Inventors: Tomio Hama, Okaya (JP); Kazuhiko Kasuga, Ina (JP)

(73) Assignee: Yugen Kaisha Hama International, Nagano (JP)

( * ) Notice: Subject to any disclaimer, the term of this patent is extended or adjusted under 35 U.S.C. 154(b) by 0 days.

(21) Appl. No.: 10/683,444

(22) Filed: Oct. 14, 2003

(65) Prior Publication Data

US 2004/0074741 A1 Apr. 22, 2004

(30) Foreign Application Priority Data

Jun. 7, 2002 (JP) ........................................ 2002-167458

(51) Int. Cl.[7] ........................ B65G 17/06; B65G 17/38; B65G 21/00; B65G 21/08; B65G 21/10
(52) U.S. Cl. ................................. 198/850; 198/860.3
(58) Field of Search ................................. 198/850, 851, 198/853, 860.3

(56) References Cited

U.S. PATENT DOCUMENTS 6,029,797 A * 2/2000 Olsson ....................... 198/852

FOREIGN PATENT DOCUMENTS

| JP | 09-177902 A | 7/1997 |
|---|---|---|
| JP | 2001-003997 A | 1/2001 |

* cited by examiner

Primary Examiner—Gene O. Crawford
(74) Attorney, Agent, or Firm—Birch, Stewart, Kolasch & Birch, LLP

(57) ABSTRACT

The tough guide chain is capable of easily connecting and disconnecting link modules. The guide chain includes a plurality of link modules detachably connected. Each link module comprises: a main body section including a bottom plate, a pair of side plates extended from the bottom plate and a flexible hinge plate extended from an edge of the bottom plate: a joint section connecting the flexible hinge plate of the adjacent link module with the bottom plate of the main body section; and a flap detachably attached to the side plates. The main body section is made of an elastic resin material, and the joint section is made of a tough material so as to reinforce and support the bottom plate and the side plates.

20 Claims, 9 Drawing Sheets

GUIDE CHAIN

BACKGROUND OF THE INVENTION

The present invention relates to a guide chain capable of guiding and protecting cables, tubes, etc.

Guide chains are used in machines having movable parts, e.g., robots, so as to prevent entanglement of cables, tubes, hoses, etc., which are connected to the movable parts.

A conventional guide chain includes a plurality of link modules made of synthetic resin, and the link modules are pivotably connected by fitting a pin into a hole of the adjacent link module. An angle between the adjacent link modules is limited. With this structure, the guide chain is capable of guiding cables without folding them.

In the conventional guide chain in which the link modules are connected by the pin-hole connecting mechanism, the link modules pivot on the pins when a movable part, to which the guide chain is connected, is moved. Since the link modules pivot many times, the pins and inner faces of the holes are abraded, and resin dusts formed by abrasion contaminate surroundings. If the guide chain is used in a clean room, the resin dusts badly influence products.

In the conventional guide chain in which the link modules are connected by the pin-hole connecting mechanism, the pins collide with the inner faces of the holes, so that noise is generated while the guide chain is moved. To reduce noise, link modules made of resin including reinforcing fillers or elastic resin including no reinforcing fillers were proposed. However, in the guide chains made of the elastic resin, noise can be effectively reduced, but they do not have enough toughness. Namely, the guide chains made of the elastic resin cannot be applied to machines, which move the guide chains at high speed with high load.

To solve the problems of the conventional guide chain in which the link modules are connected by the pin-hole connecting mechanism, guide chains, in which link modules can pivot without using the pin-hole connecting mechanism, were proposed (see Japanese Patent Gazettes No. 09-177902 and No. 2001-3997). In the guide chains, link modules are serially pivotably connected by elastic connecting members or elastic hinge members.

However, in the guide chains disclosed in the Japanese Patent Gazettes, additional link modules cannot be connected, so length of the guide chains cannot be adjusted according to machines. And, if one of link modules is broken, the guide chain must be completely exchanged. Further, curvature of turning the guide chain cannot be changed, and the guide chain cannot be reversely turned.

SUMMARY OF THE INVENTION

The present invention was invented to solve the problems of the conventional guide chains.

An object of the present invention is to provide a tough guide chain capable of pivoting link modules without using the pin-hole connecting mechanism and easily connecting and disconnecting link modules.

Another object is to provide a guide chain capable of adjusting curvature of turning and reversely turning at a mid part.

To achieve the objects, the present invention has following structures.

Namely, the guide chain includes a plurality of link modules, which are detachably connected and each of which comprises:

a main body section including:
a bottom plate;
a pair of side plates being vertically extended from the bottom plate; and
a flexible hinge plate being extended from an edge of the bottom plate:
a joint section connecting the flexible hinge plate of the adjacent link module with the bottom plate of the main body section; and
a flap being detachably attached to the side plates so as to open and close a space between the side plates,
wherein the main body section is made of an elastic resin material, and
the joint section is made of a tough material so as to reinforce and support the bottom plate and the side plates of the main body section.

In the guide chain of the present invention, an angle between the adjacent link modules can be changed by the flexible hinge plate, so that forming resin dusts can be prevented, generating noise can be restricted. The guide chain can be properly applied to machines, which move the guide chain at high speed with high load. Since the main body section is made of the elastic resin material, abrasion of cables, etc. can be prevented, and forming resin dusts and generating noise can be restricted. Further, the main body section and the joint section constitute one link module, the link modules can be easily connected and disconnected. Therefore, the guide chain can be widely used.

In the guide chain, the joint section may comprise a bottom plate and a pair of side plates, which are similar to those of the main body section, the side plates of the joint section may be respectively fitted in the side plates of the main body section, and the bottom plate of the joint section may be connected to the flexible hinge plate of the main body section. With this structure, the main body section made of the elastic resin material can be effectively reinforced, so that tough link modules can be produced.

In the guide chain, a connecting pin may be formed in the bottom plate of the main body section, a first connecting hole, in which the connecting pin can be fitted, may be formed in the flexible hinge plate, and a second connecting hole, in which the connecting pin can be fitted, may be formed in the bottom plate of the joint section. With this structure, the joint section effectively connects the main body section and the hinge plate of the adjacent link module.

In the guide chain, hooks may be respectively formed in the side plates of the main body section, engage holes may be respectively formed in the side plates of the joint section, and the hooks may respectively engage with the engage holes when the side plates of the joint section is respectively fitted in the side plates of the main body section. With this structure, the joint section can be securely fixed to the main body section.

In the guide chain, an angle limiter, which limits angle between the adjacent link modules, may be provided to the side plate of the main body section. With this structure, curvature of the guide chain can be adjusted.

In the guide chain, a boss may be formed in one side face of the side plate of the main body section, a recess may be formed in the other side face of the side plate of the main body section, and the boss and the recess may be capable of engaging with the recess and the boss of the adjacent link modules. With this structure, twist of the link modules can be prevented.

In the guide chain, an intermediate plate may be detachably spanned between the side plates of the joint section, and a partition may be detachably attached between the bottom plate of the main body section and the flap.

In the guide chain, a turning link module may be provided between the link modules, and the turning link module may comprise:

a pair of side plates, which are similar to those of the main body section;

a first connecting plate being spanned between upper ends of the side plates;

a second connecting plate being spanned between lower ends of the side plates;

a connecting pin being provided to the first connecting plate and capable of connecting with the flexible hinge plate of the adjacent link module, and a flexible hinge plate being extended from the second connecting plate, the flexible hinge plate being capable of connecting with the bottom plate of the adjacent link module. With this structure, the guide chain can be reversely turned at a mid part.

In the guide chain, the joint section may be made of a tough resin material including reinforcing fillers, and the joint section may be made of a metal.

In the guide chain, the flap may be made of an elastic resin material including no reinforcing fillers. With this structure, abrasion of cables, etc. can be effectively restricted.

In the guide chain, a the flap may be made of a tough resin material including reinforcing fillers, wherein none of the reinforcing fillers are project from a surface of the flap. With this structure, the guide chain has enough toughness and abrasion of cables, etc. can be effectively restricted.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

The guide chain includes a plurality of link modules, which are serially connected. Each of the link modules includes a main body section and a joint section.

Figure 1A:
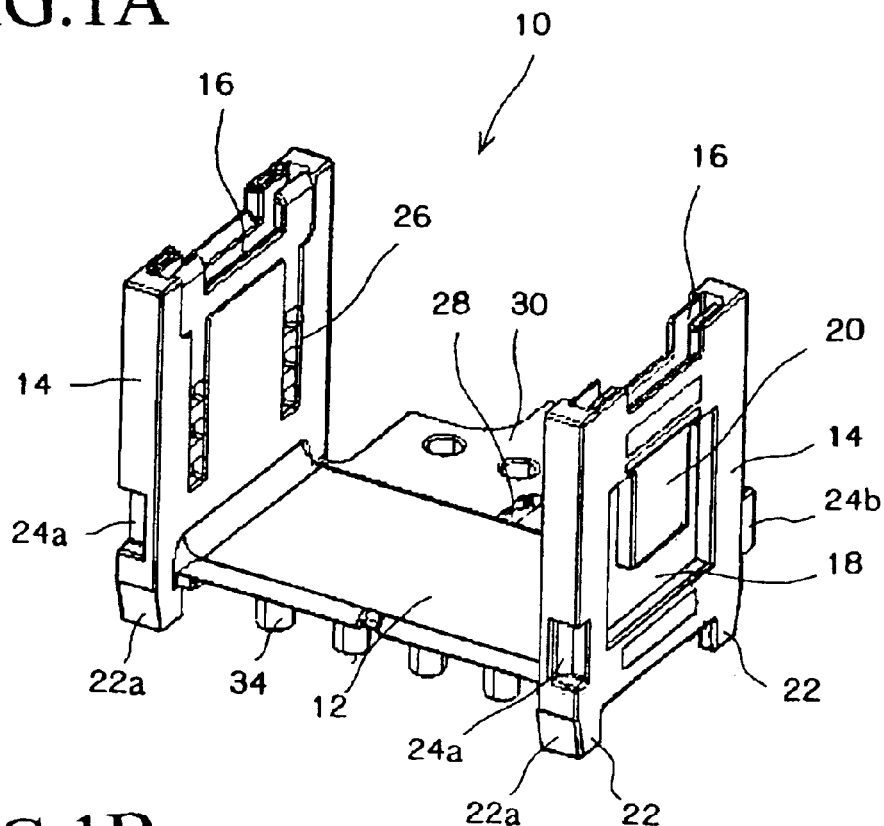
FIG. 1A is a perspective view of a link module seen from an upper side.
Figure 1B:
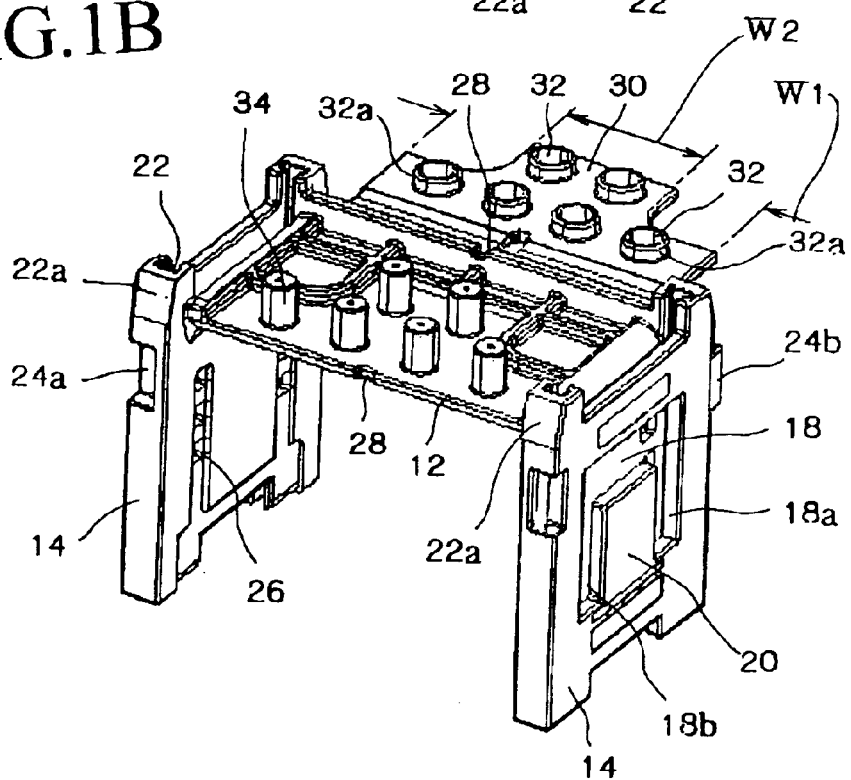
FIG. 1B is a perspective view of the link module seen from a lower side.

FIG. 1A is a perspective view of the main body section of the link module seen from an upper side, and FIG. 1B is a perspective view of the main body section seen from a lower side.

The main body section 10 includes a bottom plate 12 and a pair of side plates 14, each of which is vertically extended upward from each side edge of the bottom plate 12. A space is formed between the side plates 14. The bottom plate 12 and the side plates 14 of the main body 10 are integrally formed by resin molding. A flap 60 will be detachably attached between upper ends of the side plates 14 (see FIG. 3). After cables, etc. are pierced through the space between the side plate 14, the flap 60 is attached.

Connection grooves 16 are respectively formed in the side plates 14. The grooves 16 are vertically formed, and side plates 44 of the joint section 40 (see FIGS. 2A and 2B) will be fitted into the grooves 16. Opening sections 18 are formed in outer side faces of the side plates 14, so inner faces of the grooves 16 are partially exposed from the opening sections 18. Hooks 20 are respectively extended inward from edges of the opening sections 18. The hooks 20 are capable of engaging with the joint section 40 so as to fix the joint section 40 to the main body section 10.

Projected sections 22 are formed at lower ends of the side plates 14, and they are downwardly projected from four corners of the bottom plate 12. An angle limiter 22a is formed in each of the projected sections 22, and it faces the adjacent link module when the link modules are connected (see FIG. 3). The angle limiters 22a are slope faces formed in the projected sections 22. When the adjacent link module contacts the angle limiters 22a, an angle between the two link modules is limited.

A recess 24a is formed in one end face of each side plate 14; a boss 24b is formed in the other end face of each side plate 14. The recesses 24a are capable of receiving the bosses 24b of the adjacent link module; the bosses 24b are capable of fitting into the recesses 24a of the adjacent link module. By fitting the bosses 24a with the recesses 24b, twist of the guide chain can be prevented.

Figure 9:
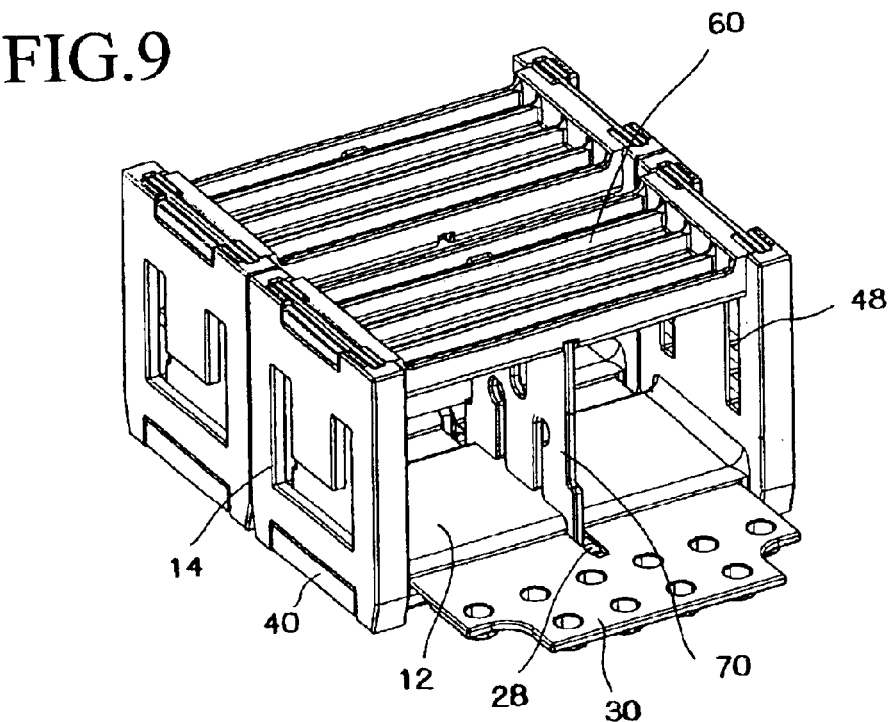
FIG. 9 is a perspective view of the link modules having partitions.

Holding grooves 26 for holding an intermediate plate 72 (see FIG. 10) are formed in inner faces of the side plates 14; holding grooves 28 for holding a partition 70 (see FIG. 9) are formed at centers of both edges of the bottom plate 12. By fitting the partition 70 in the holding grooves 28, the space between the side plates 14 is divided into two parts as shown in FIG. 9.

A flexible hinge plate 30 is integrated with the bottom plate 12 and horizontally extended therefrom. The hinge plate 30 is extended outward from the end faces of the side plates. Width "W1" of a base end of the hinge plate 30 is greater than width "W2" of a front end thereof. Connecting holes 32 are formed in the hinge plate 30. In a bottom face of the hinge plate 30, short cylindrical sections 32a are downwardly extended from edges of the connecting holes 32.

In FIG. 1, columnar connecting pins 34 are integrated with the bottom plate 12, and they are downwardly extended therefrom. An outer diameter of the connecting pin 34 is equal to an inner diameter of the connecting hole 32. The connecting pins 34 correspond to the connecting holes 32. By fitting the connecting pins 34 in the connecting holes 32 of the adjacent link module, two link modules can be connected. In the present embodiment, six connecting pins 34 are provided, but number of the connecting pins 34 can be optionally designed.

Note that, the main body section 10 is made of an elastic resin material. By employing the elastic resin material for the main body section 10, the connected link modules (the guide chain), which have no pin-hole connecting mechanisms, can be bent by the flexibility of the main body sections 10. The main body section 10 is made of a resin material having enough elasticity, e.g., polyamide, thermoplastic elastomer, thermoplastic polyurethane elastomer, vinyl chloride, polyethylene, polypropylene, etc. Proper elasticity of the resin material of the main body section 10 is less than 2 GPa of Young's module. In the present embodiment, the Young's module of the resin material is 0.3–0.5 GPa. Generally, elastic resin materials include no reinforcing fillers, but resin materials including reinforcing fillers and having enough elasticity can be employed as the elastic resin materials of the main body section 10. In the present invention, if resin materials including reinforcing fillers have enough elasticity, they can be considered as the elastic resin materials.

Figure 2A:
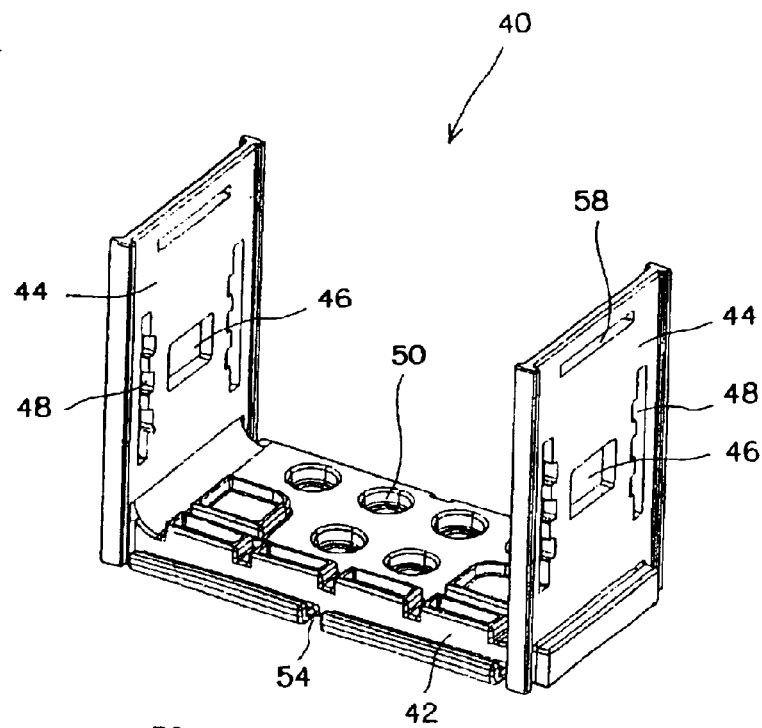
FIG. 2A is a perspective view of a joint section seen from an upper side.
Figure 2B:
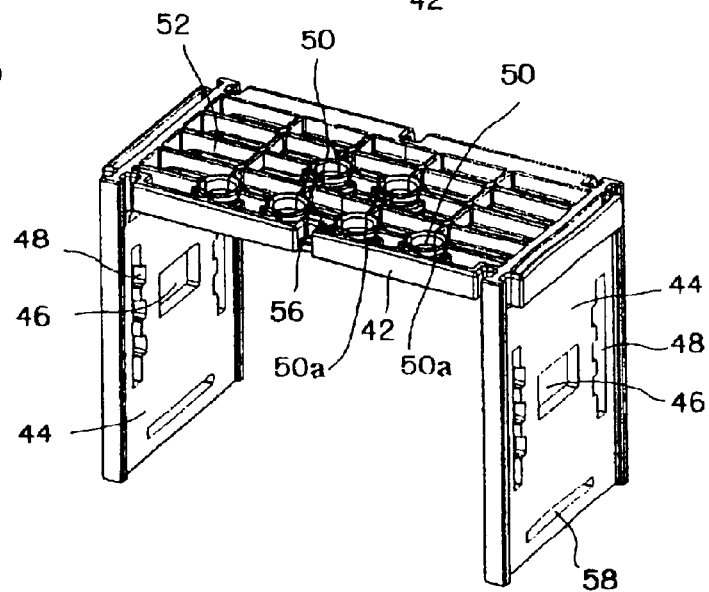
FIG. 2B is a perspective view of the joint section seen from a lower side.

FIG. 2A is a perspective view of the joint section 40 of the link module seen from an upper side, and FIG. 2B is a perspective view of the joint section 40 seen from a lower side.

The joint section 40 includes a bottom plate 42 and a pair of side plates 44, each of which is vertically extended upward from each side edge of the bottom plate 42. The bottom plate 42 and the side plates 44 of the joint section 40 are integrally formed by resin molding. Width and thickness of the side plates 44 are designed to fit into the connection grooves 16 of the side plates 14 of the main body section 10. Engage holes 46 are respectively formed at centers of the side plates 44. The hooks 20 of the side plates 14 engage with the engage holes 46 when the side plates 44 are fitted into the grooves 16 of the side plate 14. By engaging the hooks 20 with the engage holes 46, the joint section 40 is fixed to the main body section 10. Attachment holes 48 for holding the intermediate plate 72 and brackets are formed in the side plates 44.

Holes 50 for fixing the connecting pins 34 are formed in the bottom plate 42. The holes 50 are arranged to correspond to the connecting holes 32 and the connecting pins 34. An inner diameter of the holes 50 is equal to the outer diameter of the connecting pins 34. Short cylindrical sections 50a are extended from edges of the holes 50 as well as the short cylindrical sections 32a. A large diameter section for accommodating the short cylindrical sections 32a is formed in each of the holes 50. Ribs 52 are provided in a bottom face of the bottom plate 42 so as to reinforce the bottom plate 42. A groove 54 for escaping the partition 70 and a groove 56 for fixing the partition 70 are formed in the bottom plate 44. Holes 58 for holding the flap 60 are respectively formed in the side plates 44.

In the present embodiment, the bottom plate 42 and the side plates 44 are integrally made of a tough resin material including reinforcing fillers. Since the joint section 40 is made of the tough resin material including the reinforcing fillers, the main body section 10 made of the elastic resin material can be reinforced, so that the link module can have enough toughness for guiding and protecting cables, etc. If resin materials including no reinforcing fillers have enough toughness, they may be employed as the resin material for the joint section 40. Further, the joint section 40 may be made of a metal.

Figure 3:
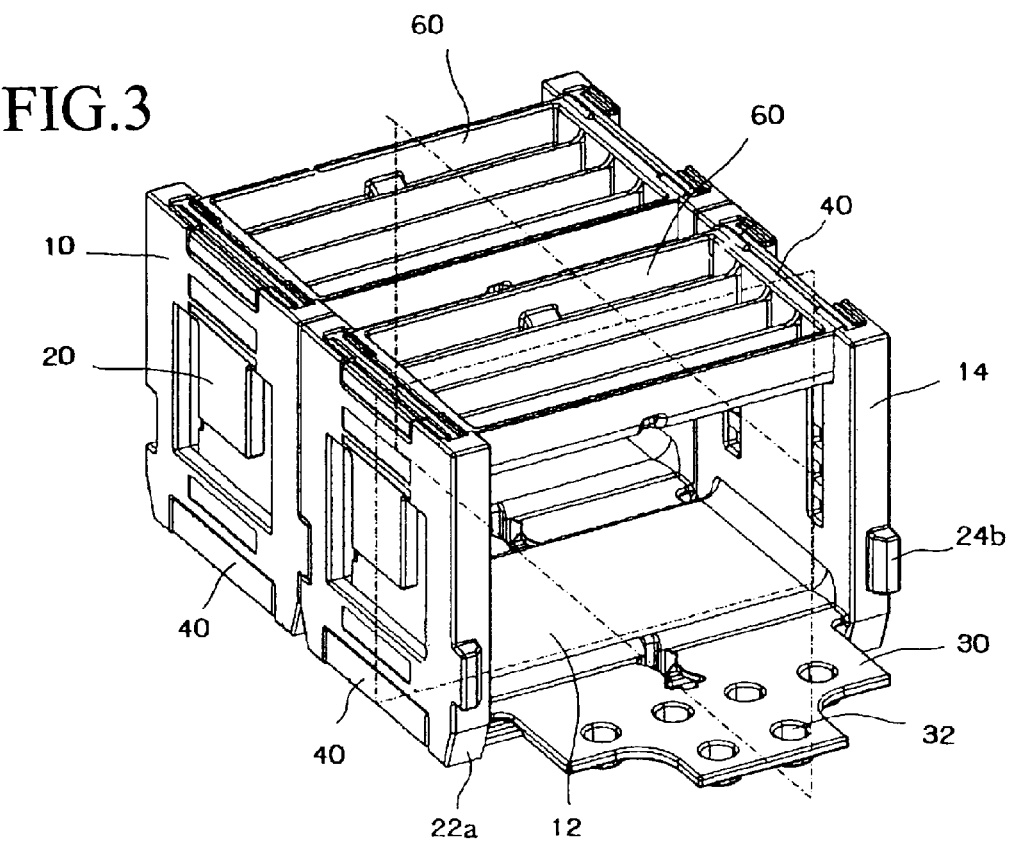
FIG. 3 is a perspective view of the link modules connected seen from an upper side.
Figure 4:
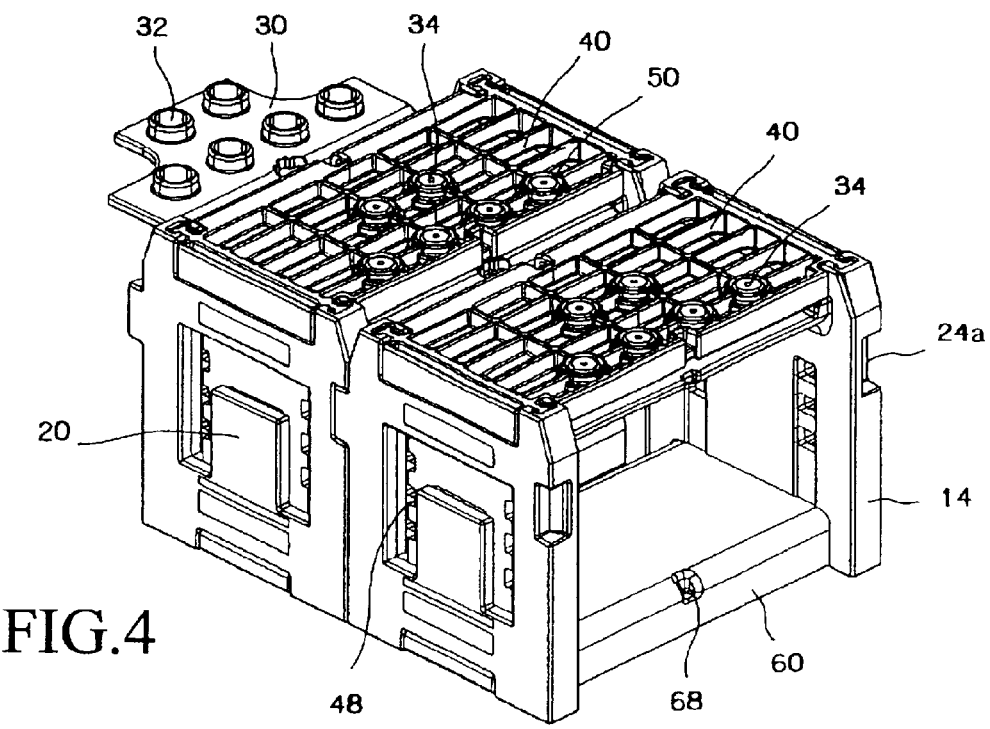
FIG. 4 is a perspective view of the link modules connected seen from a lower side.

FIG. 3 is a perspective view of the link modules connected seen from an upper side, and FIG. 4 is a perspective view of the link modules connected seen from a lower side. In each of the link modules, the joint section 40 is fitted to the main body section 10. Namely, the side plates 44 of the joint section 40 are fitted in the grooves 16 of the side plates 14 of the main body section 10, and the flap 60 is detachably attached between upper ends of the side plates 14. Note that, in the present invention, the link module comprises the main body section 10, the joint section 40 and the flap 60.

FIGS. 5A–5D are explanation views showing a manner of serially connecting the link modules. Note that, the explanation views are perspective views seen from a lower side.

Figure 5A:
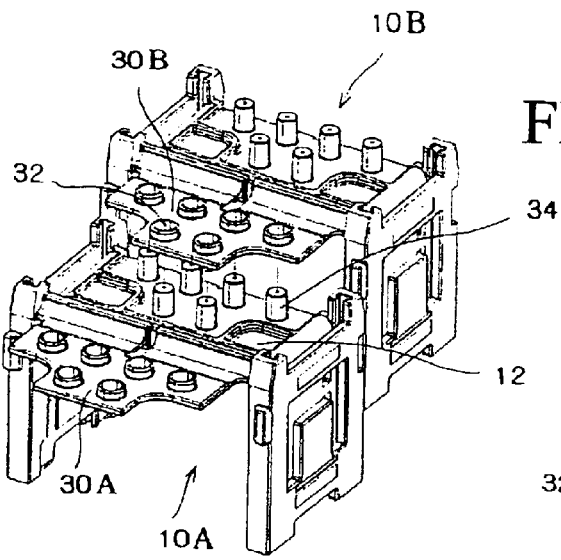
FIGS. 5A–5D are explanation views showing a manner of connecting the link modules.
Figure 5B:
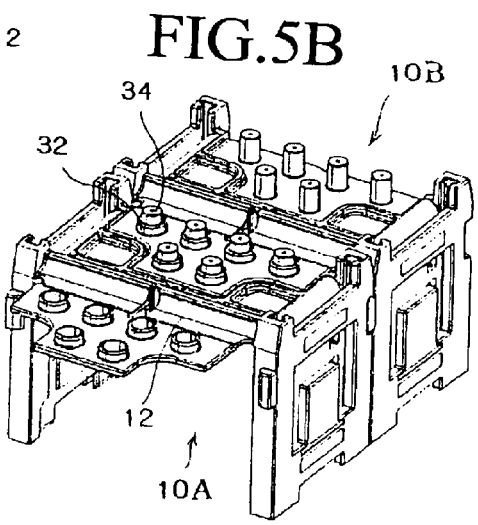

In FIG. 5A, the hinge plate 30 of the main body section 10B is placed over a bottom face of the bottom plate 12 of the main body section 10A. In FIG. 5B, the connecting pins 34 of the main body section 10A are fitted into the connecting holes 32 of the main body section 10B, so that the hinge plate 30 of the main body section 10B is connected with the bottom plate 12 of the main body section 10A.

Figure 5C:
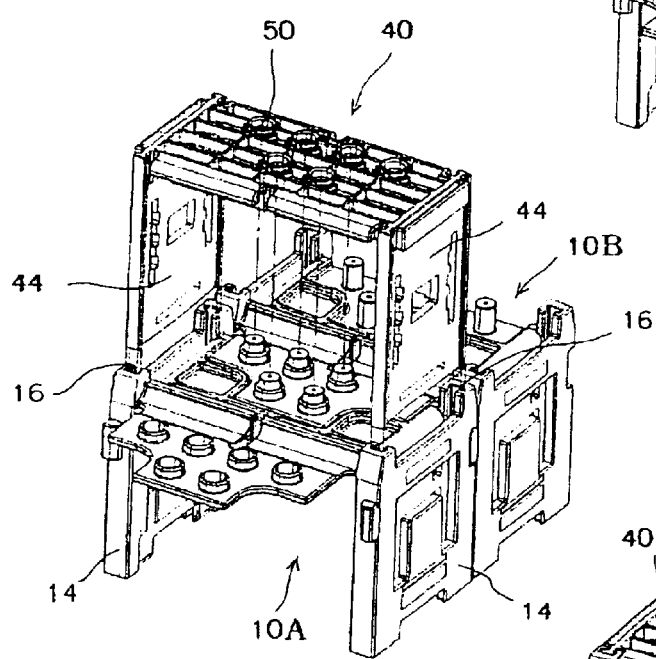
Figure 5D:
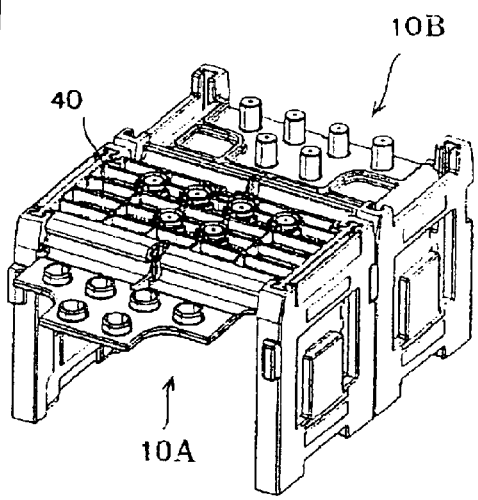

In FIG. 5C, the joint section 40 of the main body section 10A is placed over a bottom face of the hinge plate 30 of the main body section 10B, which has been connected to the bottom plate 12 of the main body section 10A. In FIG. 5D, the side plates 44 of the joint section 40 are respectively fitted in the grooves 16 of the side plates 14 of the main body section 10A. At that time, the connecting pins 34 and the short cylindrical sections 31a of the main body section 10A are fitted in the holes 50 of the joint section 40, so that the main body section 10B is connected to the main body section 10B. After the joint section 40 is attached, the flap 60 is attached to the main body section 10A. By repeating the above described steps, the link modules are serially connected (see FIGS. 3 and 4).

In FIGS. 3 and 4, two link modules are connected; in an actual guide chain, many link modules are serially connected.

Figure 7:
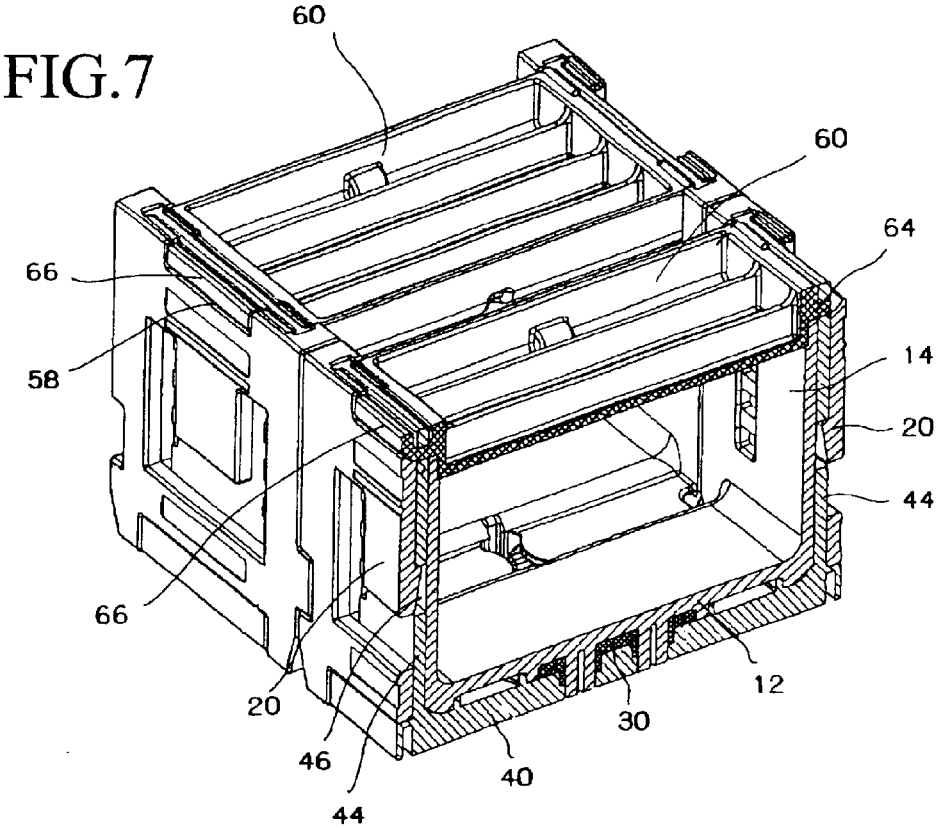
FIG. 7 is a perspective transverse sectional view of the link modules connected.
Figure 6:
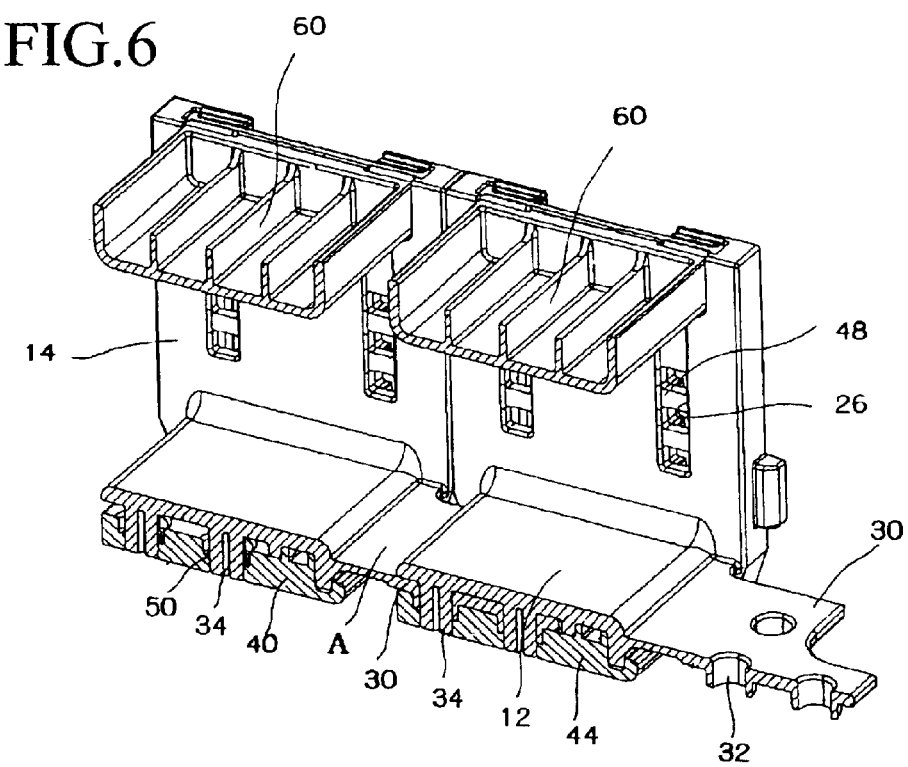
FIG. 6 is a perspective longitudinal sectional view of the link modules connected.

FIG. 6 is a perspective longitudinal sectional view of the link modules connected, and FIG. 7 is a perspective transverse sectional view of the link modules connected. As shown in FIG. 6, the hinge plate 30 of one link module is outwardly extended from the bottom plate 12 to a bottom face of the bottom plate 12 of the adjacent link module the connecting pins 34 are fitted in the connecting holes 32. Further, the bottom plate 42 of the joint section 40 is fitted to a bottom face of the hinge plate 30.

In FIG. 7, the side plates 44 of the joint section 40 are fitted in the grooves 16 of the side plates 14. The hooks 20 are engaged with the engage holes 46 of the side plates 44. Further, the flap 60 is engaged with the holes 58 of the side plates 44.

Figure 8A:
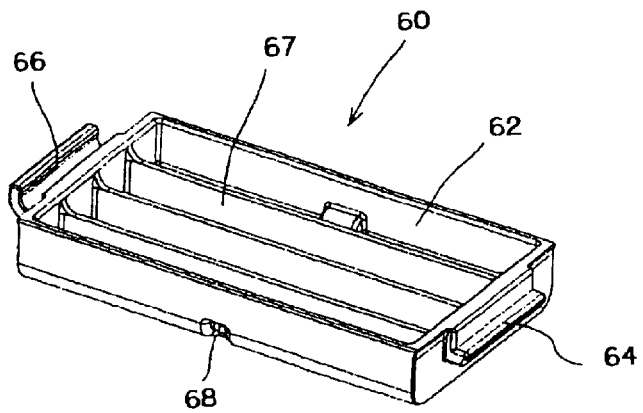
FIG. 8A is a perspective view of a flap seen from an upper side.
Figure 8B:
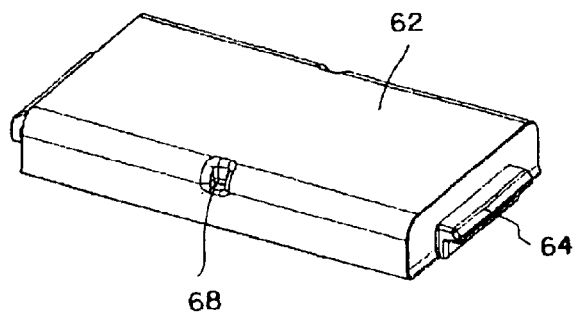
FIG. 8B is a perspective view of the flap seen from a lower side.

As shown in FIGS. 8A and 8B, the flap 60 includes a body portion 62, a first hook 64, which is provided to one end of the body portion 62, and a second hook 66, which is provided to the other end of the body portion 62. The first hook 64 is inserted into the hole 58 of one of the side plates 44; the second hook 66, whose front end is curved, is inserted into the hole 58 of the other side pate 44. After the flap 60 is attached between the side plates 44, the flap is capable of turning about the second hook 66, so that the flap is capable of opening and closing the space between the side plates 14. If the second hook 66 is inserted into the hole 58 of one of the side plates 44 and the first hook 64 is inserted into the hole 58 of the other side plate 44, the flap 60 can be turned in the reverse direction.

Ribs 67 for reinforcing the flap 60 and grooves 68 for engaging the partition 70 are formed in the flap 60.

The flap 60 may be made of an elastic resin material and a tough resin material. The resin material are selected according to required strength of the guide chain. If reducing abrasion of cables, etc. is required but toughness of the flap 60 is not required, the flap 60 may be made of the elastic resin material.

By employing the elastic resin material, inner faces of the link module, which contact cables, etc., are the elastic resin material, so that abrasion of cables, etc. can be effectively restricted.

On the other hand, if reducing abrasion of cables, etc. and toughness of the flap 60 are required, the flap 60 may be made of a resin material having enough toughness or a resin material including reinforcing fillers. In the case of employing the resin material including reinforcing fillers, no reinforcing fillers project from a surface of the flap 60. If reinforcing fillers are projected from the surface, cables, etc. will be abraded. By selecting proper resin materials having enough toughness, the cable chain is capable of having enough toughness and preventing abrasion of cables, etc.

In the present embodiment, width of the flap 60 is equal to that of the side plates 14. By attaching the flap 60 between the side plates 14 and the side plates 44, the link module can be formed like a box having enough toughness.

As described above, a plurality of the main body sections 10, which are made of an elastic resin material, are serially connected so as to form the guide chain. Connected parts of the adjacent main body sections 10 are reinforced by the joint section 40. Since the joint sections 40 are made of a tough resin material or a metal, the main body sections 10, which are made of the elastic resin material, can be reinforced, so that the guide chain, which has enough toughness and which is capable of preventing abrasion of cables, etc., can be produced.

As shown in FIG. 6, a part "A" of the hinge plate 30, which is located between the bottom plates 12 of the adjacent link modules, is flexible and acts as a hinge, so that the angle between the adjacent link modules can be changed.

The link modules are mutually connected without employing the pin-hole connecting mechanism, abrasion occurred between the link modules can be prevented, so that forming resin dusts and problems caused by resin dusts can be prevented. Therefore, the guide chain can be preferably used in a clean room.

In the guide chain of the present embodiment, the hinge plate 30 is made of an elastic resin material, so the guide chain can follow a high speed bending action. Namely, the guide chain can be preferably used in high speed operating machines.

The guide chain is bent at hinge plates 30 only, and the guide chain has no sliding and colliding parts. Therefore, noise of the guide chain, which is generated while driving the guide chain, can be reduced.

If the side plates 14 and the angle limiters 22a of the adjacent link modules collide each other, noise is generated. However, in the present embodiment, the main body sections 10 are made of the elastic resin material, so that noise generated by colliding the side plates 14, etc. can be effectively restricted. By restricting the noise, working environment in a factory and durability of the guide chain can be improved.

In the present embodiment, each of the link modules is constituted by the same parts. The link module or modules can be optionally attached to and detached from the guide chain. Therefore, a length of the guide chain can be easily adjusted according to machines. When the guide chain is partially broken, the broken link modules can be easily exchanged.

In the case of partially changing the angle between the adjacent link modules, the link module whose angle limiters 22a have different angle is connected. For example, in the case of the guide chain having 10 link modules, 5 link modules may make curvature of R100 and the rest link modules may make curvature of R200. Further, angles of the angle limiters 22a of all link modules may be different.

By changing the limited angle between the link modules or curvature of the guide chain at a mid part, interference with other members can be prevented.

In the present embodiment, each of the link modules is constituted by the same parts, so the guide chain can be applied to many ways of use.

Figure 10:
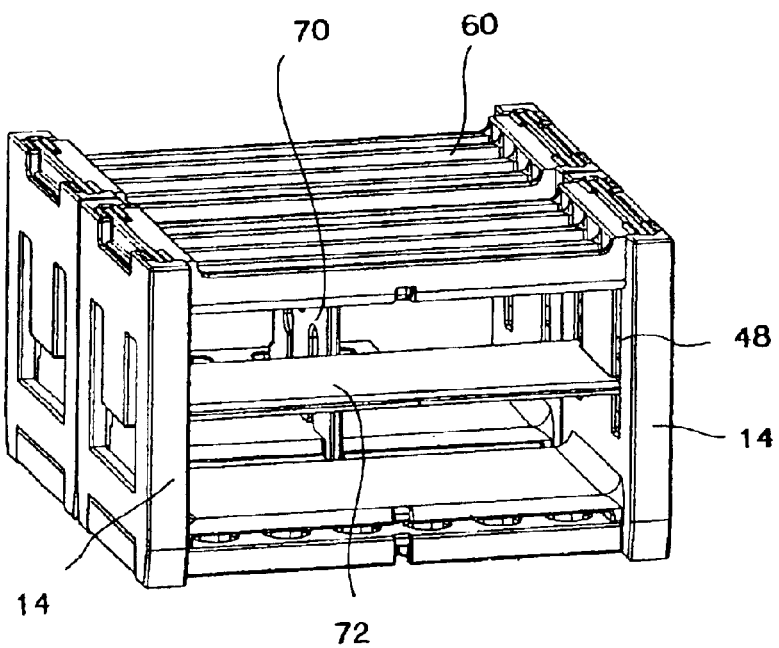
FIG. 10 is a perspective view of the link modules having intermediate plates.

FIG. 9 is a perspective view of the link modules having the partitions 70 and FIG. 10 is a perspective view of the link modules having the intermediate plates 72. The inner space of each link module is divided into a plurality of portions by the partition 70 or the intermediate plate 72.

In FIG. 9, the inner space of the link module is divided into a right portion and a left portion by the partition 70. The partition 70 is engaged with the grooves 28 of the bottom plate 12 and the grooves 68 of the flap 60.

In FIG. 10, the intermediate pate 72 is spanned between the side plates 14. The intermediate plate 72 is engaged with the attachment holes 48 of the joint section 40, so that the intermediate plate 72 can be spanned between the side plates 14. Since the intermediate plate 72 is engaged with the tough joint section 40, the intermediate plate 72 can be securely supported. A plurality of engage sections are formed in each of the engage holes 48 of the side plates 14, so the intermediate plate 72 can be selectively engaged with the engage sections. In FIG. 10, the link module including the partition 70 and the link module including the intermediate plate 72 are alternately arranged. With this structure, an inner space of the guide chain is divided into four parts.

Figure 11A:
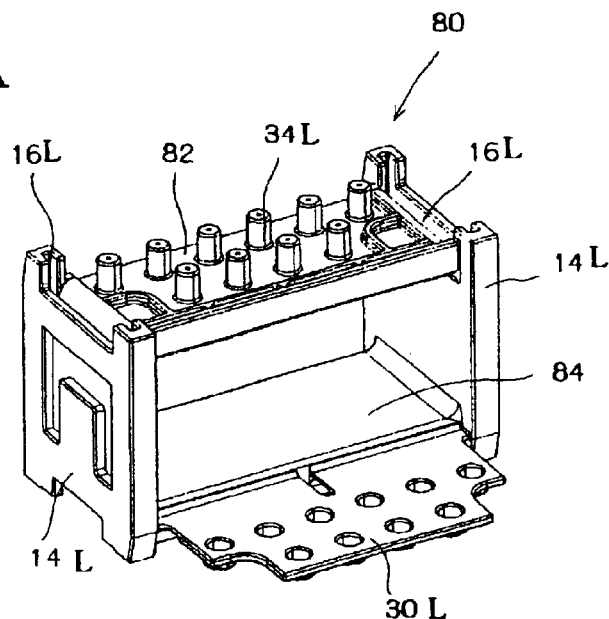
FIG. 11A is a perspective view of a turning link module seen from an upper side.

The guide chain of the present invention can be reversely turned at a mid part. FIG. 11A is a perspective view of a turning link module seen from an upper side, and FIG. 11B is a perspective view of the turning link module seen from a lower side.

Figure 11B:
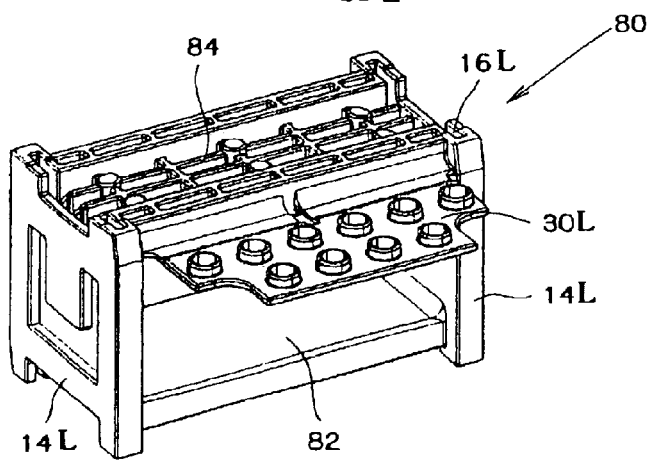
FIG. 11B is a perspective view of the turning link module seen from a lower side.

In the embodiment shown in FIGS. 11A and 11B, the turning link module 80 is provided between the link modules described above. By the turning link module 80, the guide chain can be reversely turned.

As shown in FIGS. 11A and 11B, the turning link module includes side plates 14L having connection grooves 16L as well as the main body section 10. Unlike the link module described above, a first connecting plate 82 is spanned between upper ends of the side plates 14L, and a second connecting plate 84 is spanned between lower ends of the side plates 14L. No flap is provided between the side plates 14L. In the above described link module, the connecting pins 34 are provided to the bottom plate 12, and the hinge plate 30 is extended from the bottom plate 12. On the other hand, in the turning link module 80, connecting pins 34L are provided to the first connecting plate 82, and a flexible hinge plate 30L is extended from the second connecting plate 84. Namely, the connecting pins 34L are provided in an upper part of the turning link module 80; the hinge plate 30L is provided in a lower part thereof.

Figure 12:
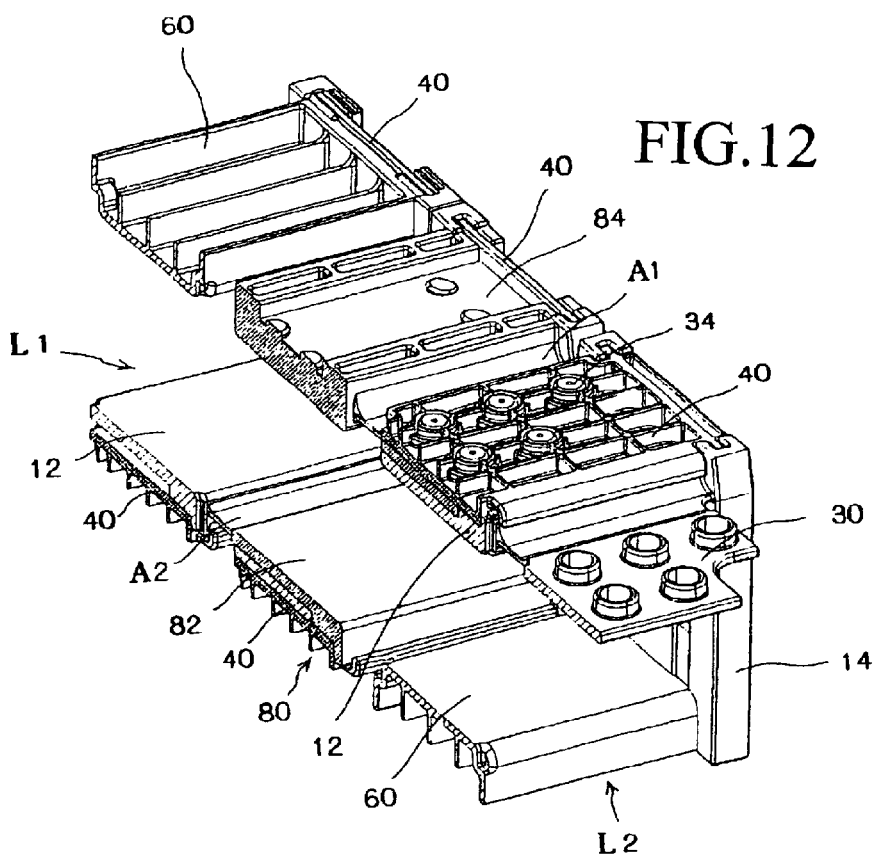
FIG. 12 is a perspective sectional view of the turning link modules provided between the link modules.

FIG. 12 is a perspective sectional view of the turning link modules 80 provided between the link modules L1 and L2 described above, and they are seen from a lower side.

The hinge plate 30 extended from the bottom plate 12 of the link module L1 is connected to a bottom face of the first connecting plate 82, in which the connecting pins 34L are formed. The side plates 44 of the joint section 40 are fitted into the grooves 16L of the turning link module 80 from the lower side of the hinge plate 30. With this structure, the tuning link 80 can be connected with the link module L1.

The hinge plate 30L extended from the second connecting plate 84 of the turning link module 80 is connected to the bottom plate 12 of the link module L2. The hinge plate 30L is fixed to the bottom plate 12 by the joint section 40. With this structure, the tuning link 80 can be connected with the link module L2.

Since vertical arrangement of the connecting pins 34L and the hinge plate 30L of the turning link module 80 is inverted with respect to that of the link modules L1 and L2, the link modules located on the rear side of the turning link module 80 are inverted with respect to those located on the forward side thereof.

In FIG. 12, the guide chain can be reversely turned at portions A1 and A2 of the hinge plates.

The turning link module 80 can be optionally provided in the guide chain. Since all of the link modules can be exchanged to the turning link module 80, the guide chain can be reversely turned at an optional position. Attachments to be attached to ends of the guide chain will be explained with reference to FIGS. 13–15.

Figure 13:
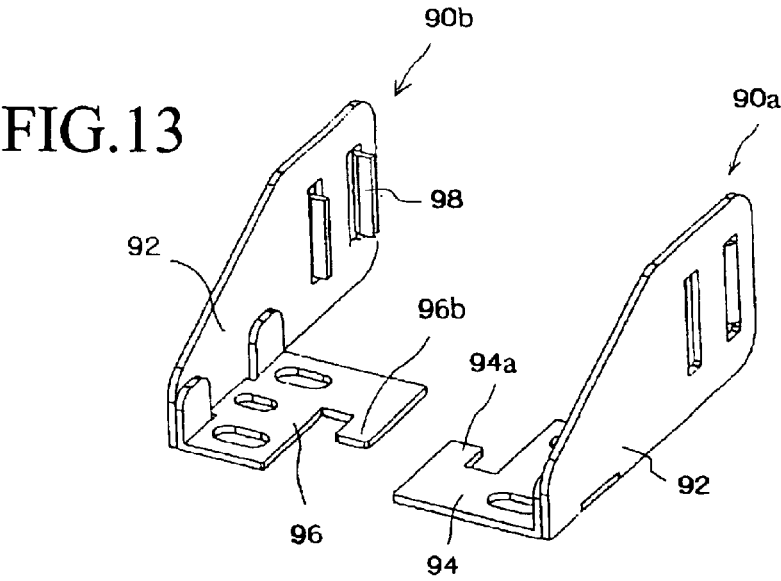
FIG. 13 is a perspective view of an attachment.

As shown in FIG. 13, the attachment includes two parts 90a and 90b. The parts 90a and 90b are formed into L-shapes. Namely, connecting plates 94 and 96 are respectively extended inward from side plates 92 of the parts 90a and 90b. Hooks 94a and 94b are respectively formed at front ends of the connecting plates 94 and 96. The hooks 94a and 94b can be engaged with each other. Claws 98 are extended inward from inner faces of the side plates 92. The claws 98 are capable of engaging with the opening sections 18 of the side plates 14 of the main body section 10 of the link module. As shown in FIG. 1B, grooves 18b, which are formed along edges of the hooks 20 in the opening sections 18. Outer faces of the side plates 44 of the joint section 40 are partially exposed in the grooves 18b. Namely, step sections are formed between the outer faces of the side plates 14 and the outer faces of the side plates 44. The claws 98 will be inserted into the grooves 18b so as to engage with attachment holes 48 of the side plates 44. By engaging with the attachment holes 48, the attachment can be attached.

Figure 14:
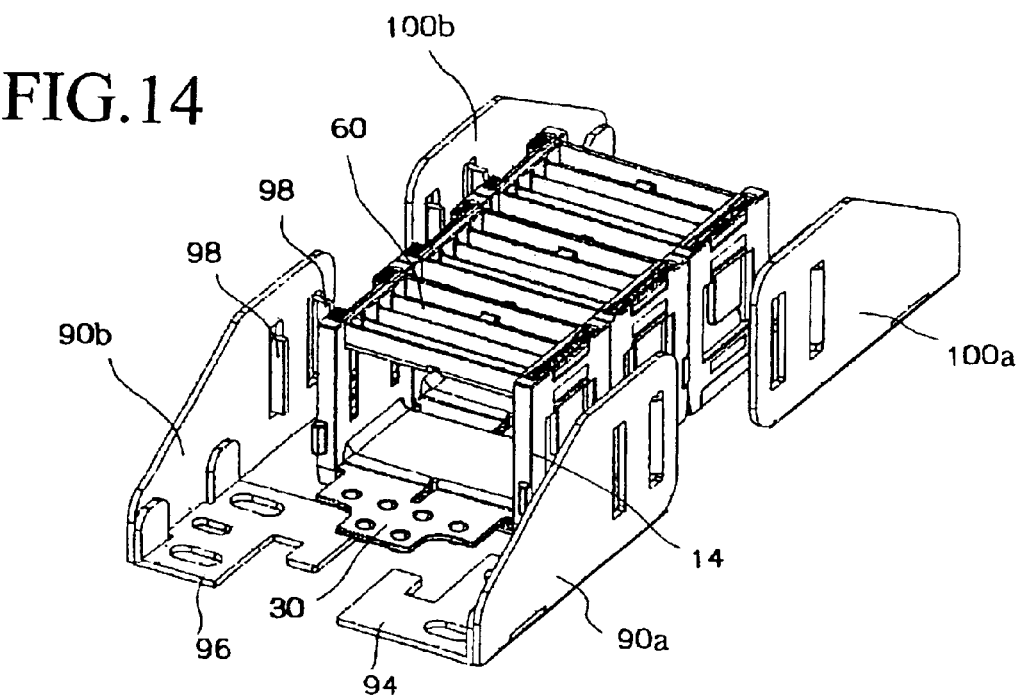
FIG. 14 is a perspective view of the attachments and the link modules.

In FIG. 14, when the parts 90a and 90b of the inner attachment are attached, the parts 90a and 90b are provided on the both sides of the guide chain. Then, the claws 98 are engaged with the grooves 18b of the link module. An outer attachment including parts 100a and 100b are also attached to the outermost link module by the same manner. In the example shown in FIG. 14, the inner attachment including the parts 90a and 90b and the outer attachment including the parts 100a and 100b are attached to the end of the guide chain, which has three link modules; actually, the attachments are attached to a guide chain including many link modules and having a prescribed length.

Figure 15:
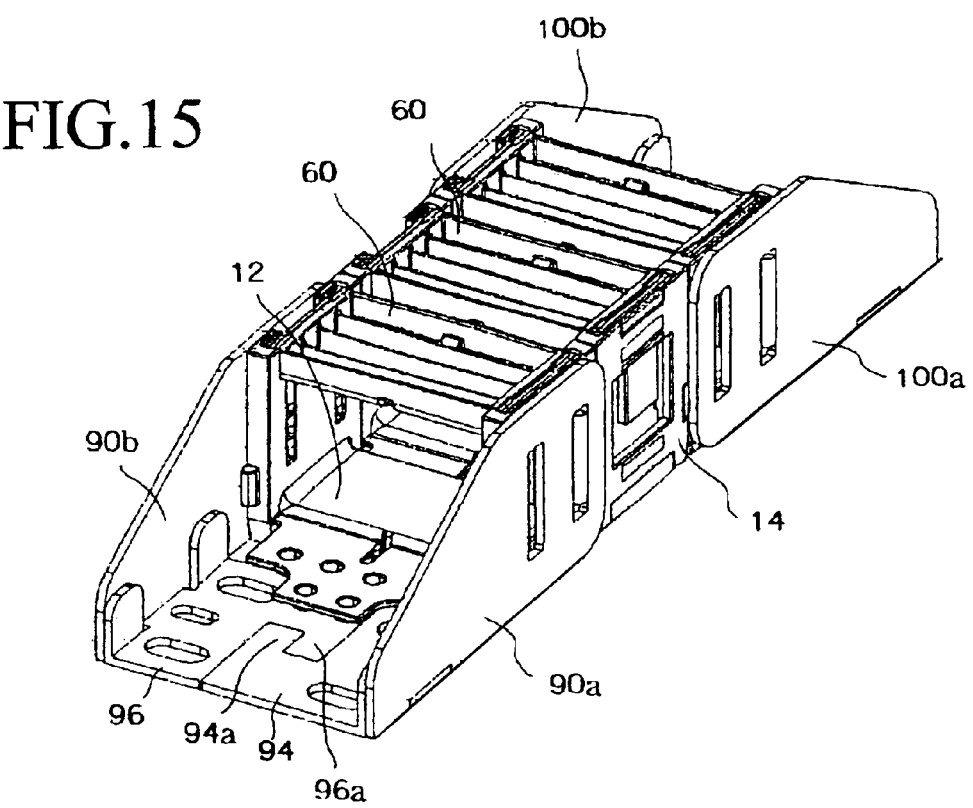
FIG. 15 is a perspective view the attachments attached to the link modules.

In FIG. 15, the parts 90a, 90b, 100a and 100b are completely attached to one end of the guide chain. The hooks 94a and 96a are engaged with each other so as not to disconnect the attachments. Note that, the outer attachment including the parts 100a and 100b will be fixed to a fixed member of a machine.

Conventionally, a shape of an inner attachment is different from that of an outer attachment. On the other hand, in the present embodiment, shapes of the inner attachment and the outer attachment are same. Therefore, the attachments can be correctly and easily attached without disarrangement. Other types of attachments are not required, so manufacturing cost of the attachments can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A guide chain including a plurality of link modules, which are detachably connected and each of which comprises:
    a main body section including:
        a bottom plate;
        a pair of side plates being vertically extended from the bottom plate; and
        a flexible hinge plate being extended from an edge of the bottom plate:
            a joint section connecting the flexible hinge plate of the adjacent link module with the bottom plate of said main body section; and
            a flap being detachably attached to said side plates so as to open and close a space between said side plates,
    wherein said main body sections of the link modules are made of an elastically deformable resin material, and
    said joint section is made of a stiffer material so as to reinforce and support the bottom plate and the side plates of said main body section.

2. The guide chain according to claim 1,
    wherein an angle limiter, which limits an angle between the adjacent link modules, is provided to the side plate of said main body section.

3. The guide chain according to claim 1,
    wherein a boss is formed in one side face of the side plate of said main body section,
    a recess is formed in the other side face of the side plate of said main body section, and
    said boss and said recess are capable of engaging with the recess and the boss of the adjacent link modules.

4. The guide chain according to claim 1,
    wherein a partition is detachably attached between the bottom plate of said main body section and said flap.

5. The guide chain according to claim 1,
    wherein a turning link module is provided between said link modules, and said turning link module comprises:
        a pair of side plates, which are similar to those of said main body section;
        a first connecting plate being spanned between upper ends of said side plates;

a second connecting plate being spanned between lower ends of said side plates;

a connecting pin being provided to the first connecting plate and capable of connecting with the flexible hinge plate of the adjacent link module, and a flexible hinge plate being extended from the second connecting plate, the flexible hinge plate being capable of connecting with the bottom plate of the adjacent link module.

6. The guide chain according to claim 1, wherein said joint section is made of a tough resin material including reinforcing fillers.

7. The guide chain according to claim 1, wherein said joint section is made of a metal.

8. The guide chain according to claim 1, wherein said flap is made of an elastic resin material including no reinforcing fillers.

9. The guide chain according to claim 1, wherein said flap is made of a tough resin material including reinforcing fillers, and none of the reinforcing fillers project from a surface of said flap.

10. The guide chain according to claim 1, wherein said joint section comprises a bottom plate and a pair of side plates, which are similar to those of said main body section, the side plates of said joint section is respectively fitted in the side plates of said main body section, and the bottom plate of said joint section is connected to the flexible hinge plate of said main body section.

11. The guide chain according to claim 10, wherein a connecting pin is formed in the bottom plate of said main body section, a first connecting hole, in which the connecting pin can be fitted, is formed in the flexible hinge plate, and a second connecting hole, in which the connecting pin can be fitted, is formed in the bottom plate of said joint section.

12. The guide chain according to claim 10, wherein hooks are respectively formed in the side plates of said main body section, engage holes are respectively formed in the side plates of said joint section, and the hooks respectively engage with the engage holes when the side plates of said joint section is respectively fitted in the side plates of said main body section.

13. The guide chain according to claim 10, wherein an intermediate plate is detachably spanned between the side plates of said joint section.

14. A guide chain including a plurality of link modules, which are detachably connected and each of which comprises:

a main body section including:

a bottom plate;

a pair of side plates being vertically extended from the bottom plate; and a flexible hinge plate being extended from an edge of the bottom plate:

a joint section connecting the flexible hinge plate of the adjacent link module with the bottom plate of said main body section; and a flap being detachably attached to said side plates so as to open and close a space between said side plates, wherein said main body section is made of an elastic resin material, and said joint section is made of a tough material so as to reinforce and support the bottom plate and the side plates of said main body section, and wherein said joint section comprises a bottom plate and a pair of side plates, which are similar to those of said main body section, the side plates of said joint section is respectively fitted in the side plates of said main body section, and the bottom plate of said joint section is connected to the flexible hinge plate of said main body section.

15. The guide chain according to claim 14, wherein a connecting pin is formed in the bottom plate of said main body section, a first connecting hole, in which the connecting pin can be fitted, is formed in the flexible hinge plate, and a second connecting hole, in which the connecting pin can be fitted, is formed in the bottom plate of said joint section.

16. The guide chain according to claim 14, wherein hooks are respectively formed in the side plates of said main body section, engage holes are respectively formed in the side plates of said joint section, and the hooks respectively engage with the engage holes when the side plates of said joint section is respectively fitted in the side plates of said main body section.

17. The guide chain according to claim 14, wherein an angle limiter, which limits an angle between the adjacent link modules, is provided to the side plate of said main body section.

18. The guide chain according to claim 14, wherein a boss is formed in one side face of the side plate of said main body section, a recess is formed in the other side face of the side plate of said main body section, and said boss and said recess are capable of engaging with the recess and the boss of the adjacent link modules.

19. A guide chain including a plurality of link modules, which are detachably connected and each of which comprises:

a main body section including:

a bottom plate;

a pair of side plates being vertically extended from the bottom plate; and a flexible hinge plate being extended from an edge of the bottom plate:

a joint section connecting the flexible hinge plate of the adjacent link module with the bottom plate of said main body section; and a flap being detachably attached to said side plates so as to open and close a space between said side plates, wherein said main body section is made of an elastic resin material, and said joint section is made of a tough material so as to reinforce and support the bottom plate and the side plates of said main body section, and wherein a partition is detachably attached between the bottom plate of said main body section and said flap.

20. The guide chain according to claim 19, wherein an intermediate plate is detachably spanned between the side plates of said joint section.

* * * * *